126,904

UNITED STATES PATENT OFFICE.

NATHANIEL A. PRATT, OF CHARLESTON, SOUTH CAROLINA, AND GEORGE T. LEWIS, OF PHILADELPHIA, PENNSYLVANIA.

IMPROVEMENT IN THE TREATMENT OF PHOSPHATES FOR THE MANUFACTURE OF FERTILIZERS, &c.

Specification forming part of Letters Patent No. 126,904, dated May 21, 1872.

*To all whom it may concern:*

Be it known that we, NATHANIEL A. PRATT, of Charleston, South Carolina, and GEORGE T. LEWIS, of Philadelphia, Pennsylvania, have invented a new and useful Improved Method in Grinding Phosphates, Rock, or other phosphatic substance or other material, and for mixing the same with acids, and for the extraction of the phosphoric acid or soluble phosphates, and for mixing the same with lime or other bases, or their salts, so as to form the various salts of phosphoric acid; and we do hereby declare the following to be a full, clear, and exact description of the same.

Our process is adapted especially to the treatment of the native phosphates of South Carolina, or any other phosphatic material, but may be also used in other kindred applications.

It consists in grinding the phosphatic material say ten (10) tons in an ordinary burrstone-mill, or chaser, or other well-known form of mill, and while this is going on a graduated stream of dilute acid is fed into the mill of sufficient strength and quantity to dissolve or decompose the phosphate or other material, and having sufficient water with it to form, with the resulting mass, a paste. For this purpose there will be required a mixture of sulphuric acid five to five and a half tons, more or less, of strength 66° Baumé, and of water, either fresh or salt, ten to fifteen tons, more or less according to the composition of the material being treated. A floating siphon may be employed to regulate the amount of acid and water supplied to the mill according to the amount of material ground in a given time.

Instead of sulphuric acid any other acid or acid salt may be employed.

The mixed paste produced is to be placed in ordinary bagging-sacks, or such other parcel as may be found most efficient, and submitted to hydraulic pressure or other pressure until the phosphoric extract is squeezed out. This is to be collected, and the residual cake used for fertilizing, either alone or combined with other substances. This extract (having previously ascertained its composition) is to be poured into a mill and ground, as above described, with lime or other bases, or their salts, in such proportion as may be necessary to produce the product desired.

If the tricalcic or bicalcic phosphate is the product, the pasty mass is transferred to sacks or other parcels and pressed, as before mentioned.

Having thus described our invention, what we claim, and desire to secure by Letters Patent of the United States, is—

1. Grinding together crude phosphatic material, acid, and water, substantially as described, to obtain crude phosphoric acid or phosphate of lime or other bases, as above described.

2. In combination with the grinding of crude phosphatic material, water, and acid, as above described, we claim the squeezing or pressing of our product in bags, substantially as above described, to obtain the phosphoric extract, substantially as above described.

3. We claim the grinding together of the phosphoric extract and lime, magnesia, or other base, or their salts, to obtain an artificial phosphate of lime or other phosphate, substantially as set forth above.

4. We claim the adaptation of burrstones or other mill to grinding in acid and water any other material which requires to be thus ground and mixed, as a "combined grinding and mixing machine," substantially as set forth.

N. A. PRATT.
GEORGE T. LEWIS.

Witnesses to signature of N. A. PRATT:
W. W. MEMMINGER,
W. Y. LEITCH.

Witnesses to signature of GEO. T. LEWIS:
J. J. BUCHEY,
WM. R. WRIGHT.